(No Model.)
G. W. SMEAL.
STUMP EXTRACTOR.
No. 485,508. Patented Nov. 1, 1892.
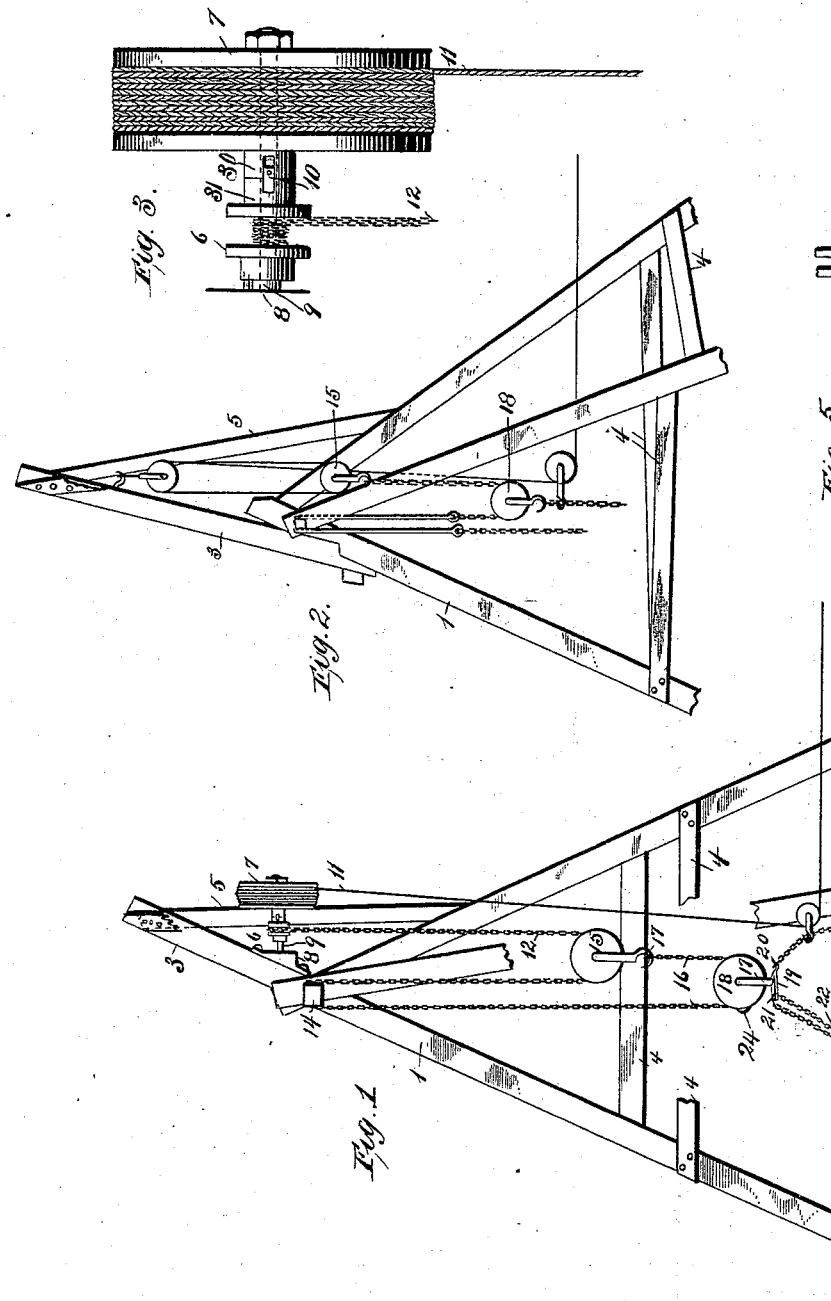
Witnesses
Louis J. Julihn
Erie J. Julihn
Inventor
G. W. Smeal
By Hopkins & Atkins
Attys

UNITED STATES PATENT OFFICE.

GEORGE W. SMEAL, OF OSCEOLA MILLS, PENNSYLVANIA.

STUMP-EXTRACTOR.

SPECIFICATION forming part of Letters Patent No. 485,508, dated November 1, 1892.

Application filed May 27, 1892. Serial No. 434,673. (No model.)

*To all whom it may concern:*

Be it known that I, GEORGE W. SMEAL, of Osceola Mills, in the county of Clearfield, State of Pennsylvania, have invented certain new and useful Improvements in Stump-Extractors, of which the following is a specification, reference being had to the accompanying drawings.

My invention has relation to improvements in stump-extractors, and is more particularly designed as an improvement on Letters Patent granted to me May 26, 1891, and numbered 453,051; and it consists in the construction and arrangement of parts, as will be hereinafter described, and particularly pointed out in the claim.

In the accompanying drawings, Figure 1 is a side elevation of my improved stump-extractor. Fig. 2 is a similar view showing a modified form of the frame heretofore illustrated in my patent referred to and showing pulley mechanism closely resembling that illustrated in said patent. Fig. 3 is a detail view of two drums mounted on a shaft, one of said drums carrying a rope, the other carrying a chain. Fig. 4 is a detail view of the swivel-plate adapted to be attached to the hook of pulley 18. Fig. 5 is a detached view of the pulley adapted to be connected to the swivel-plate.

Referring to the figures on the drawings, 1 indicates the frame of my improved stump-extractor, which preferably is made in tripod form, having one of its sides provided with an extension 3, formed from one of the framing-pieces, as shown in Fig. 1, or made in a single piece and bolted to one of the framing-pieces, as shown in Fig. 2. This extension extends upwardly above the frame at a little less angle than that illustrated in my patent above referred to.

4 designates transverse braces secured to the frame, and 5 is a vertical brace having one end secured to one of the pieces of framing, the upper end being secured to the extension, whereby the extension is held and firmly braced.

The extension 3 is provided with a bearing-block 8, secured immediately above and in contact with the upper ends of the frame, in which is mounted one end of a shaft 9, its opposite free end being provided with a drum 7 thereon, having a slotted collar 30. The shaft also has mounted thereon another drum 6, also provided with a slotted collar 31, communicating with the slotted collar on drum 7. These slotted collars are adapted to engage a lug 10 on the shaft, whereby the drums are locked together.

11 represents a rope wound on the drum 7, which is designed to be operated by a person standing on the ground. Around the drum 6 is wound a chain 12, the end of which is fastened to a projection 14, extending from the side of the frame, and carries on it a pulley 15, as shown. This pulley may be attached directly to the stump-lifting mechanism; but where greater power is needed I prefer to use another chain 16, that also has its end fastened to projection 14, its opposite end being secured to a clevis 17 on a pulley 15. The chain 16 is connected to a pulley 18 below the pulley 15, said pulley 18 in this instance being attached directly to the stump mechanism. This stump mechanism consists of any suitable means for grappling the stump, which preferably consists of a chain fastened under it. For the purpose of fastening the chain I prefer to use a swivel-plate 19, that may be swiveled to the clevis 17 on the pulley 18. I may use any other suitable lifting mechanism than that just described. The swivel-plate is provided at one end with a hook 20, its opposite end being provided with a crotch or forked end 21.

22 designates a chain having one end fastened to the hook 20 of the swivel-plate and, being passed around a stump, is drawn taut and fastened to the forked end of the swivel-plate by the links of the chain, as shown in Fig. 4, whereby the machine is ready for operation.

The frame of my invention may be carried upon shoes 23, as shown in the drawings, and similarly to the manner illustrated in my patent above referred to; but in place of shoes any suitable antifriction devices may be substituted—as, for instance, wheels. A catch 24 may be provided upon a pulley 18 for holding it fixed upon the chain when desired.

Instead of ropes or chains any suitable flexible material may be substituted, and I wish it to be understood that I do not limit myself to the use of one or even two pulleys in connection with my rope and chain drums. When it is desirable to secure greater power, I employ three pulleys or as great a number as may prove serviceable.

Having described my invention, what I claim, and desire to secure by Letters Patent of the United States, is—

In a stump-extractor, the combination, with a pulley, of a swivel-block connected thereto and having a hook at one end and a fork at the other and means attached to said ends for extracting purposes, substantially as and for the purposes specified.

In testimony of all which I have hereunto subscribed my name.

GEORGE W. SMEAL.

Witnesses:
JOSEPH L. ATKINS,
HOLMES E. OFFLEY.